United States Patent [19]

Jackman

[11] 4,126,052
[45] Nov. 21, 1978

[54] FRICTION TRANSMISSION

[76] Inventor: Charles W. Jackman, 5986 Alan Dr., Brighton, Mich. 48116

[21] Appl. No.: 781,561

[22] Filed: Mar. 28, 1977

Related U.S. Application Data

[63] Continuation-in-part of Ser. No. 640,021, Dec. 11, 1975, abandoned.

[51] Int. Cl.$^2$ ............... F16H 15/10; F16H 15/12
[52] U.S. Cl. .................................. 74/200
[58] Field of Search ............... 74/200, 198, DIG. 8, 74/190.5, 208, 796, 690

[56] References Cited

U.S. PATENT DOCUMENTS

| 2,619,841 | 12/1952 | Von Krudenstein | 74/200 |
| 2,734,389 | 2/1956 | Strecker | 74/200 |
| 3,163,050 | 12/1964 | Kraus | 74/200 |
| 3,163,051 | 12/1964 | Kraus | 74/200 |
| 3,164,025 | 1/1965 | Francisco, Jr. | 74/690 |
| 3,244,025 | 4/1966 | Francisco | 74/690 |
| 3,299,744 | 1/1967 | Kraus | 74/720.5 |
| 3,810,398 | 5/1974 | Kraus | 74/200 |
| 3,820,416 | 6/1974 | Kraus | 74/690 |
| 3,841,173 | 10/1974 | Kraus | 74/200 |

*Primary Examiner*—Benjamin W. Wyche
*Assistant Examiner*—William R. Henderson
*Attorney, Agent, or Firm*—Barnes, Kisselle, Raisch & Choate

[57] ABSTRACT

A friction transmission comprising a driving member and a driven member mounted for rotation about a common axis. The members having oppositely facing annular arcuate surfaces and at least one roller contacts said surfaces. The roller is supported in the roller carrier by resilient means with the axis thereof intersecting the common axis of said members. The periphery of the roller has a generally conical configuration. The annular surfaces of the driving and driven members have a configuration such that lines tangent to the periphery of the roller and the races converge at the intersection of the axes of rotation of the roller and the common axis of the members at all positions of the roller giving a true rolling action in the manner of cones with a common apex. Hydraulic means apply a force to the roller in the direction of the roller axis proportional to the driving load. The roller and roller carrier are supported by a trunnion which is in turn supported by opposed resilient means. The true rolling action without lubrication of the traction surfaces reduces the required contact pressure and permits the use of conventional thrust bearings of reasonable size.

3 Claims, 19 Drawing Figures

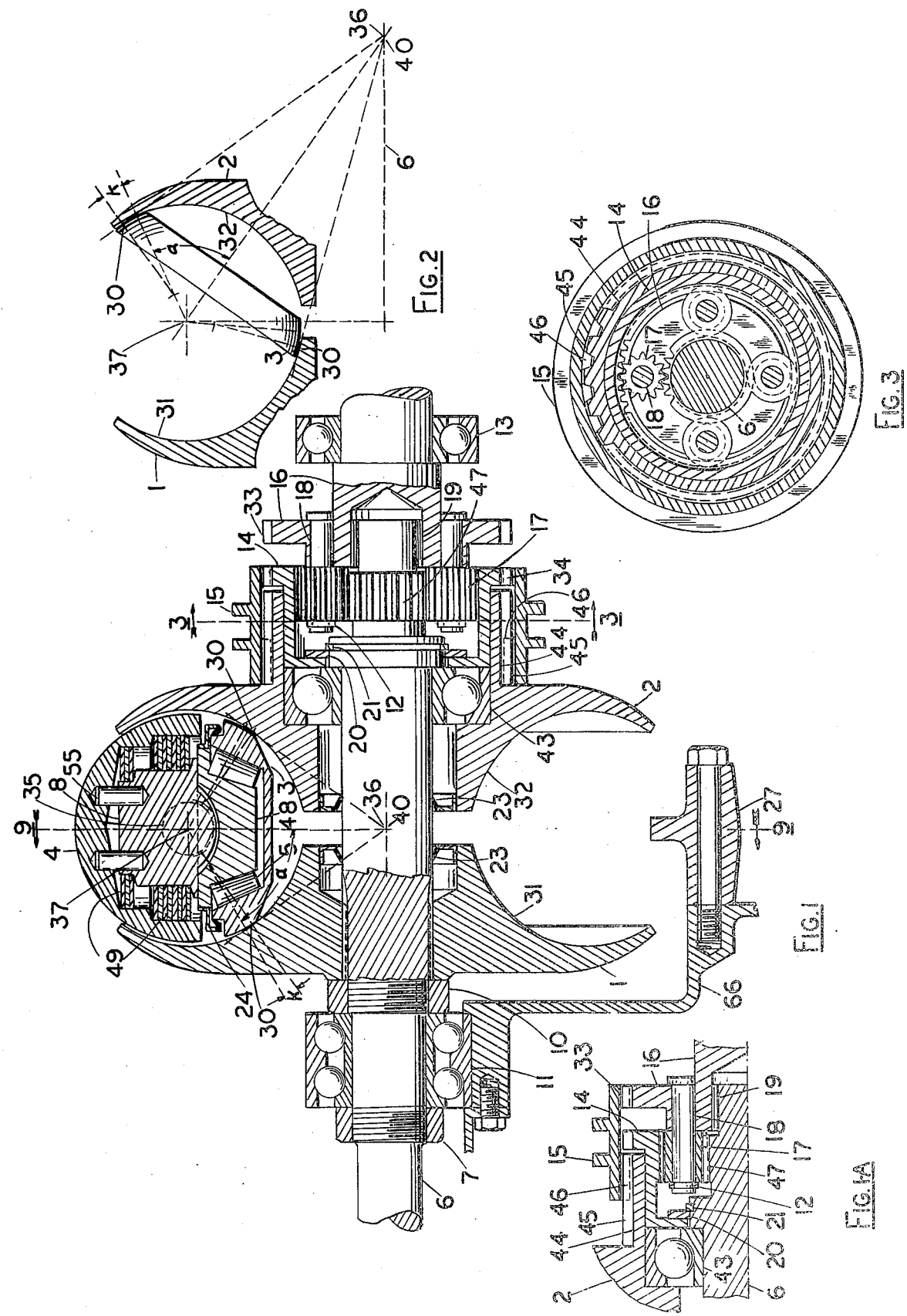

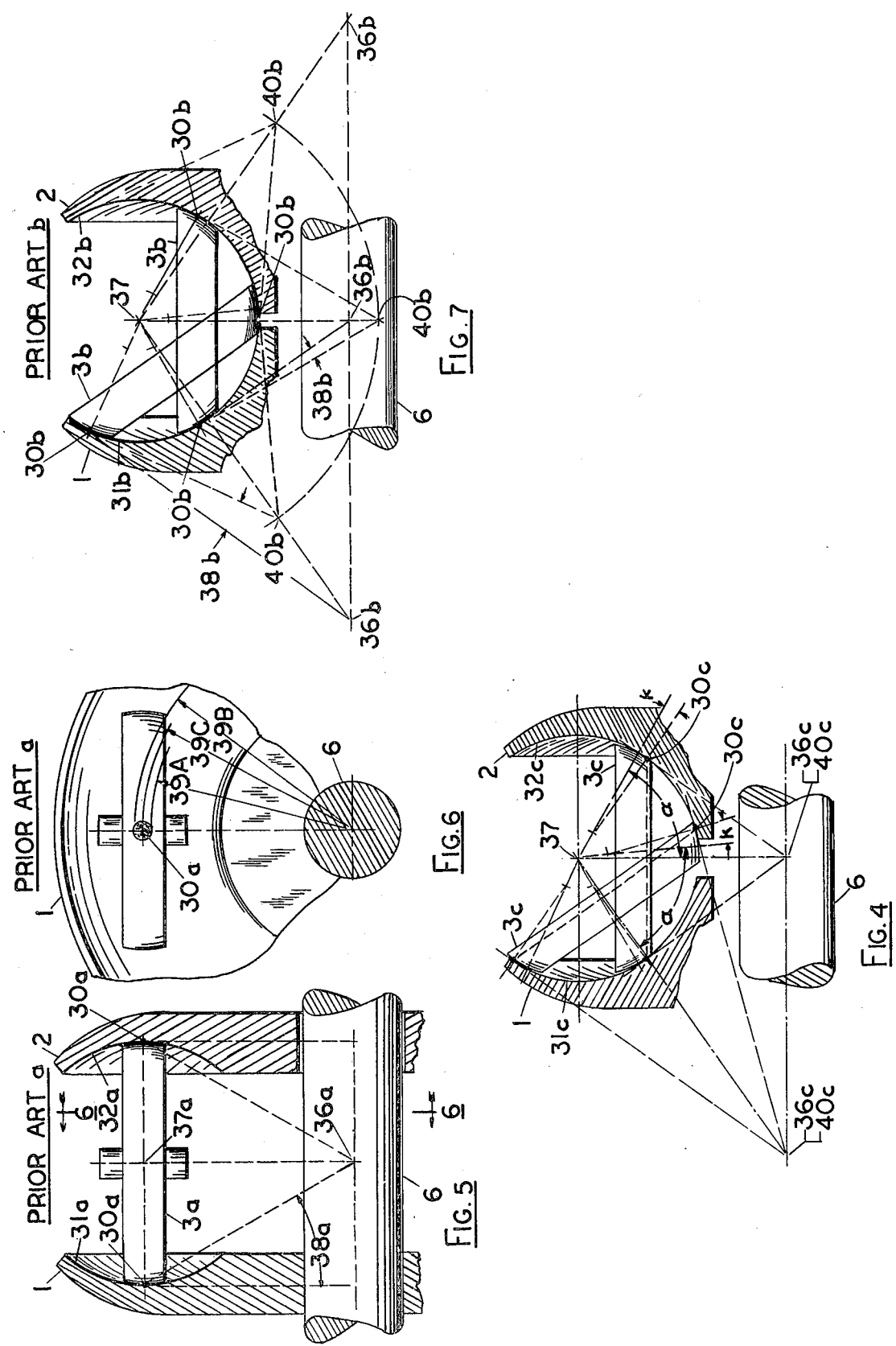

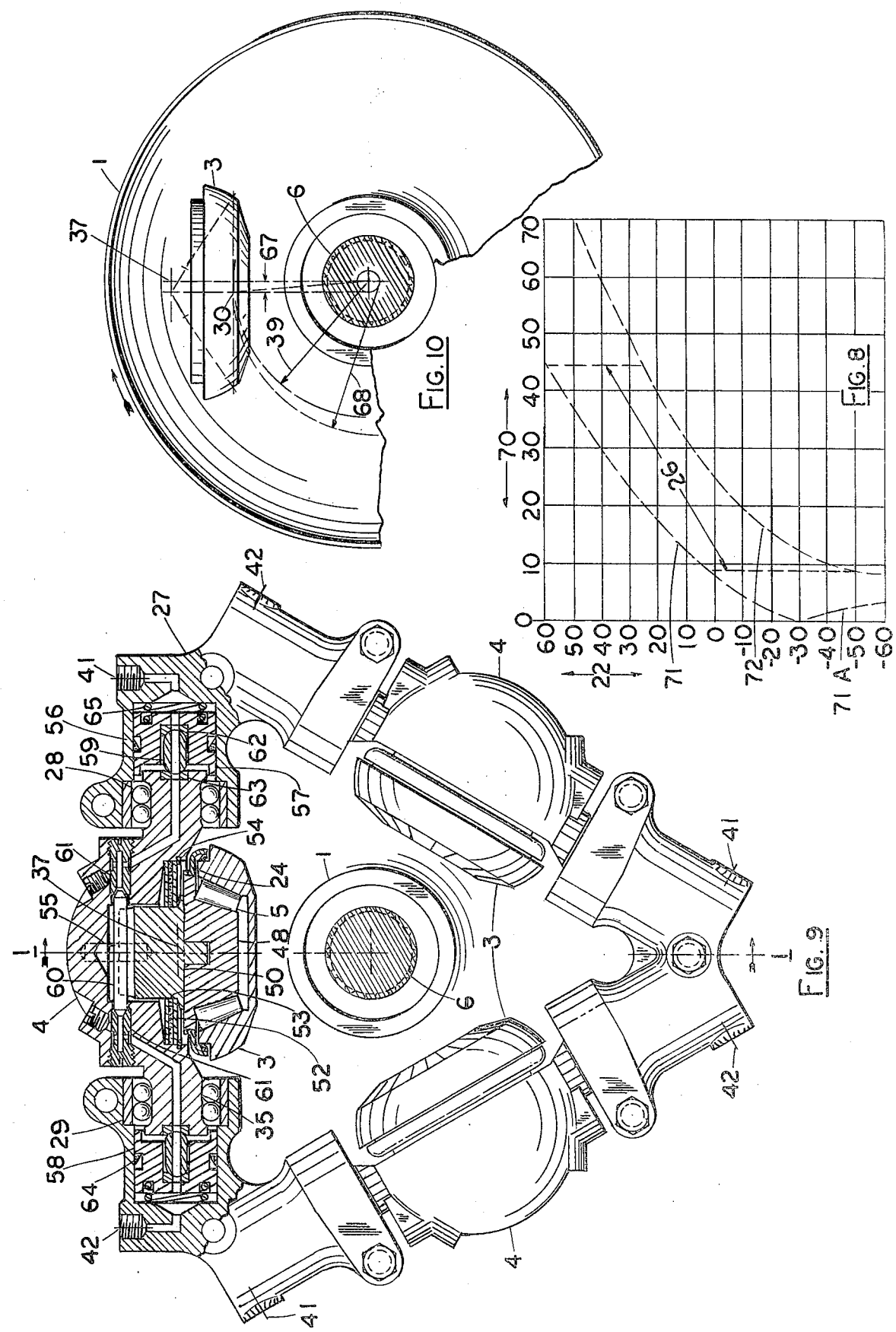

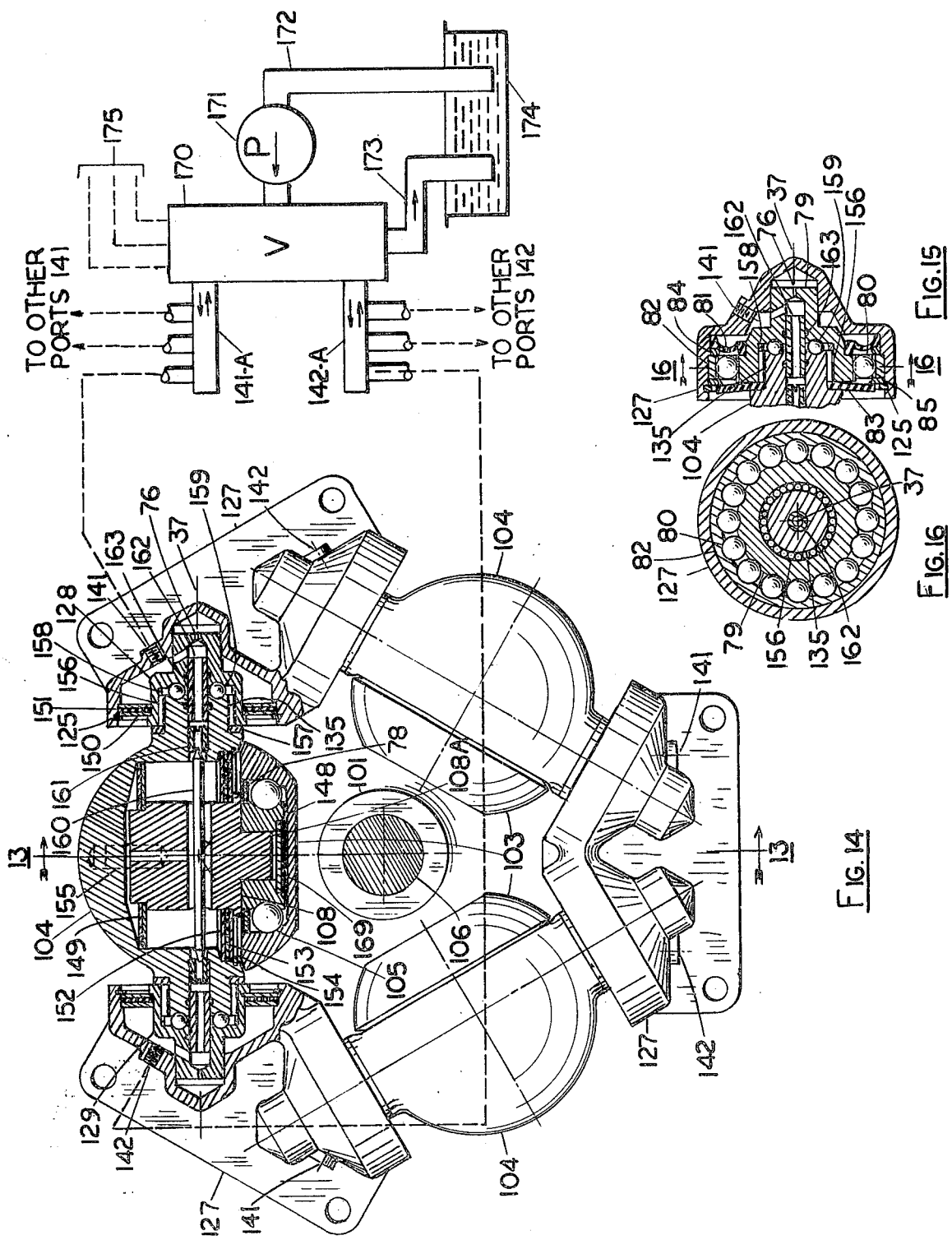

FRICTION TRANSMISSION

This application is a continuation-in-part of my application Ser. No. 640,021, filed Dec. 11, 1975, now abandoned.

This invention relates to a friction transmission with opposed toric races and interposed conical rollers.

It has heretofore been suggested that a friction transmission can be provided by utilizing coaxial driving and driven members with oppositely facing toric race surfaces in which rollers are provided in contact with the races. The axes of the rollers intersect the axes of the driving and driven members and by tilting the rollers along the axis of the driving and driven members, a variable drive is obtained. It has heretofore been recognized that when tangents to the points of contact do not converge at the intersection of the roller axis and the axis of the driving and driven members, there is no slippage or spin action resulting in wear and loss of effective tractive force. It has heretofore been suggested that the slippage can be reduced by making the periphery of the roller with a conical surface. However the transmission still does not eliminate slippage.

Among the features of the invention are:

1. True rolling contact to eliminate "spin" at the contact areas. The line tangent to the contacting surface meets the main shaft axis at the intersection of the roller axis at all times.

2. True rolling contact as between conjugate cones so there is no need to lubricate the contact areas. The space in which the rollers operate may be sealed and drained to avoid deposit of lubricant on the friction surfaces. The coefficient of friction may be further increased by the selection of race and roller materials and perhaps by coatings or other means. Friction coefficients many times higher than with lubricated surfaces may be obtained. This reduces the required contact pressure and permits use of conventional thrust bearings of reasonable size.

3. Planetary differential gears to neutralize the motion of the output shaft at a specific position (ratio) of the rollers. This provides (a) a neutral or stationary position with the transmission fully engaged and operating and (b) a gradual forward motion as the ratio is increased and (c) reverse motion as the ratio is decreased. If desired the differential gears may be bypassed and the output shaft connected directly to the output race at a suitable output shaft speed.

4. Control of ratio change by balancing the reactive force of the rollers in line with the tilt axis by (a) a hydraulic piston or (b) a mechanical control means. Movement along the tilt axis of the roller carrier in a plane normal to the main shaft axis in one direction induces a spiral motion to increase the ratio, and in the other direction to decrease it. Change in ratio produces a change in the reactive force which moves the roller carrier axially to reduce or stop the spiral movement.

5. Control of the contact pressure on the rollers in proportion to the reactive force by hydraulic means.

The invention provides a means of matching speeds of high inertia mechanical elements over a range of ratios precisely, and if desired, automatically. Examples are:

1. Vehicles having prime movers which operate most efficiently within a rather narrow range of speeds, such as a single shaft gas turbine.

2. Vehicles with "hybrid" power plants, for example an engine driving a high speed flywheel. Such an engine, of whatever type, would only need to produce sufficient power to drive the vehicle at a sustained maximum speed. When the maximum power is not required the excess energy would be stored in the flywheel and extracted as needed for acceleration, hill climbing or bursts of speed for passing. The engine could operate at maximum efficiency, perhaps intermittently. The cooling system and emission controls would be much smaller and would operate under much more uniform conditions. Regenerative braking would return large amounts of energy to the flywheel. This should greatly improve fuel efficiency of automobiles, urban busses and trucks operating in hilly terrain.

3. Battery powered electric vehicles with constant speed motors and regenerative braking.

4. Flywheel storage of off-peak electric generator power.

5. Flywheel storage of wind or solar power to drive AC generators at constant speed.

SUMMARY OF THE INVENTION

In accordance with the invention, the friction transmission comprises a conical roller which engages opposed surfaces of a driving and driven member which surfaces have a configuration such that lines tangent to the periphery of the roller and the races converge at the intersection of the axes of rotation of the roller and the common axis of the members at all positions of the roller.

DESCRIPTION OF THE DRAWINGS

FIG. 1 is a longitudinal sectional view of a friction transmission embodying the invention.

FIG. 1A is a fragmentary sectional view of a portion of FIG. 1 showing the parts in a different operative position.

FIG. 2 is a diagrammatic view of a portion of the transmission shown in FIG. 1.

FIG. 3 is a sectional view taken along the line 3—3 in FIG. 1.

FIG. 4 is a fragmentary longitudinal sectional view of a transmission embodying the invention showing the parts in a different operative position.

FIG. 5 is a fragmentary longitudinal sectional view of the prior art.

FIG. 6 is a fragmentary sectional view taken along the line 6—6 in FIG. 5.

FIG. 7 is a fragmentary longitudinal sectional view of a further form of the prior art.

FIG. 8 is a graph of tilt of rollers versus speed.

FIG. 9 is a fragmentary sectional view taken along the line 9—9 in FIG. 1.

FIG. 10 is a part sectional view of a portion of the structure shown in FIGS. 1 and 9.

FIG. 14 is a sectional view taken along the line 14—14 in FIG. 13 and showing the hydraulic circuit diagrammatically.

FIG. 15 is a part sectional view of a further modified form of a portion of the structure shown in FIG. 14.

FIG. 16 is a sectional view taken along the line 16—16 in FIG. 15.

DESCRIPTION

Figure 12:
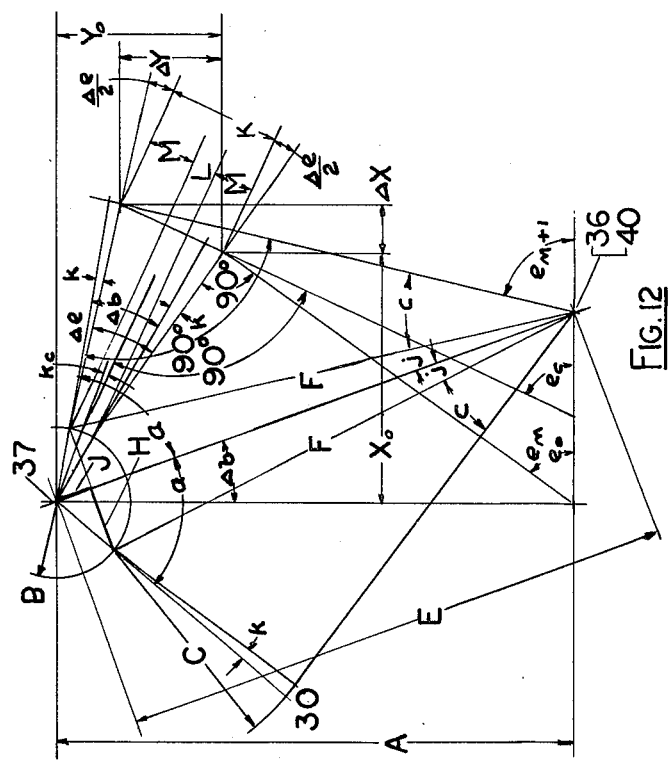
FIGS. 11 and 12 are diagrams of the geometric development of the race contours of the transmission embodying the invention.

FIG. 1 is a cross section in a plane including the axes of a main driving shaft 6, a driven shaft 16 and rollers 3. A disc 1 is splined to shaft 6 and adjusted by nut 10. A disc 2 is mounted on shaft 6 by thrust bearing 43. Disc 1 has a race groove 31 of toric form facing a race groove 32 of like form in disc 2. A set of rollers 3 contacts races 31, 32 at contact points 30. Each roller 3 is held in a roller support and carrier 4 and rotates on a bearing 5. As shown in FIGS. 1 and 9, each roller support and carrier has extensions 35 which are supported, as presently described with reference to FIG. 9, to permit the carrier with its roller to tilt as desired about an axis 37. This axis lies in a plane normal to the drive shaft axis 6 and is normal to the plane of the drawing in FIG. 1. FIG. 2 shows a roller 3 tilted about this axis.

As the driving disc 1 rotates in one direction in contact with rollers 3, the driven disc 2 will rotate in the opposite direction at a speed depending on the tilt of the rollers 3. Means for controlling and changing the tilt are shown in FIG. 9.

An essential feature of the invention is that lines tangent to the contacting surfaces of rollers 3 and races 31 and 32 converge at the intersection of the axes of rotation of rollers 3 and shafts 6 and 16 at point 40. This results in true rolling as occurs between conjugate cones. This is true whatever the tilt angle as shown also in FIGS. 2, 4 and 12.

FIGS. 5 and 6 are drawings of prior art construction such as shown in U.S. Pat. No. 1,844,464 to Ehrlich et al and show the effect of other than true rolling. In such previously known designs, with the exception noted below, the areas of contact of the roller 3a are directly opposite on a line through the tilt axes 37a. This results in an effect called "spin". It must be understood that there is no such thing as "point" contact. Any contact between two solid objects deforms the surfaces resulting in an "area" of contact. The size and shape of the area deformed depend upon the original contours of the surfaces, the strength and elasticity of the materials and on the pressure applied. FIG. 6 shows a circular area 30a at a nominal distance 39C from the axis of shaft 6. This distance is presumed to establish the ratio between race 31 and roller 3. However, other points on this area are at different distances, as 39A and 39B, tending to establish different ratios. Therefore, there must be slippage at all points not lying on the arc of a single radius. Thus there is "spin" action, somewhat as if the race 31 were turning on the roller around the center of the contact area.

This spin action has two serious effects:

(1) Wear, unless good lubrication is provided, reducing the tractive force on which the transmission depends. (2) Induced slippage on much of the area added to the tractive force reduces the effective tractive force and tends to cause gross slippage.

FIG. 7 shows a prior art construction with a roller 3b with a conical rim as described in U.S. Pat. No. 2,619,841 to Von Kreudenstein operating in races whose contours are circular arcs. Lines tangent to the contacting surfaces converge at points 40b which lie on a circular arc which crosses the axis of shaft 6 so that points 40b do not coincide with the intersection of axes at points 36b. This reduces the spin but does not eliminate it.

The angles 38a and 38b in FIGS. 5 and 7 are a measure of the spin.

In accordance with the invention as shown in FIG. 4, roller 3 with a conical rim operates in races 31 and 32, whose contours are formed so that lines tangent to the contacting surfaces always converge at the axes of rotation of roller 3 and shaft 6 as at points 36C and 40C and at 36 and 40.

Figure 11:
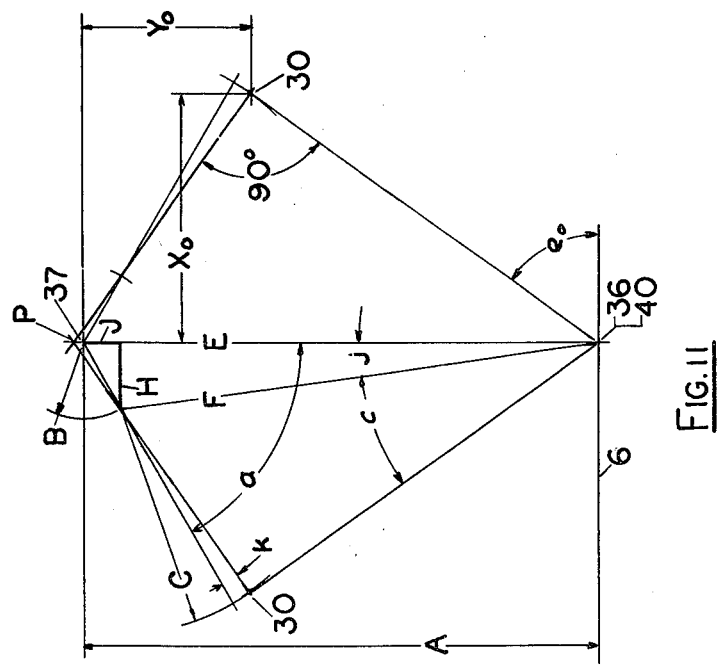

FIGS. 11 and 12 show the geometry of the roller 3 and the toric races 31, 32. As elsewhere in these drawings, 6 indicates the axis of the drive shafts, 37 the tilt axis of the roller, 30 the centers of contact of roller and race, 36 the intersection of the roller axis and axis 6, and 40 the converging point on the roller axis of lines tangent to the contacting surfaces. In these diagrams points 36 and 40 coincide. These tangent lines represent elements of conjugate cones.

In the diagram capital letters represent lengths of lines and small letters represent angles.

$A$ = distance from drive shaft axis 6 to tilt axis 37.

$C$ = radius of the convex rim of the roller rim.

$a$ = angle from the roller axis to a line through the tilt axis 37 and the center of radius C.

$B$ = distance from roller tilt axis to center of radius C.

The above values are constants. The following values vary with the tilt angle of the roller axis.

$b$ = tilt angle of the roller axis.

$E$ = distance on roller axis between points 37 and 40.

$E = A$ secant $b$.

$F$ = distance from point 40 to center of radius C.

$H$ and $J$ are sides of a right triangle with angle a at point 37.

$j$ = angle whose tangent = $H/E$-$J$ $F = (E-J)$ Secant $j$.

$c$ = angle whose sine = $C/F$ $c+j$ = angle between roller axis and element of conjugate cone which is tangent to the contact surfaces.

$e$ = angle between the line tangent to the contact surfaces and a line parallel to the drive shaft axis 6 through point 37 or the angle from axis 6 itself.

$$e + (b-c-j).$$

$k$ = angle between a line through point 37 and the center of radius C, and a line also passing through the center of radius C perpendicular to the cone element at the point of tangency.

$$k = 90° - (a+c+j).$$

Angle $k$ represents the shift of center of contact 30 on the roller rim as the roller is tilted.

If this line perpendicular to the cone element at the point of tangency is extended through the center of radius C to intersect the roller axis at points P, then point P is the instantaneous center of tilt instead of the mechanical axis at point 37. Point P shifts as the roller is tilted, moving above or below axis 37 as angle $k$ changes, becoming positive or negative.

Points on the toric curve may be located as junctions of successive chords. The angle $e_c$ of a chord is the mid-value between angles $e_n$ and $e_n+1$ derived from small increments of angle $b$. Thus $$e_c = \frac{e_n + e_{n+1}}{2}$$

As shown in FIG. 1, $X_o$ and $Y_o$ are the values at $b = 0$.

$X_o = B \text{ sine } a + C \text{ sine } e_o.$ $Y_o = -(B \text{ cosine } a + C \text{ cosine } e_o).$ FIG. 12 shows the roller tilted from the central position by an increment $\Delta b$. In this case $e_n$ is $e_o$. The length K of each chord is $$K = 2B \text{ sine } \frac{\Delta b}{2} \text{ cosine } k_c + 2C \text{ sine } \frac{\Delta e}{2} \text{ as}$$

shown in the diagram where
$L =$ the first term and 2M the second term. Here the angle $k_c$ is the value related to $e_c$.

Increment $\Delta X = K \text{ cosine } e_c$ and $\Delta Y = K \text{ sine } e_c$.

Then $X = X_o + \sum\limits_{\pm b\text{max}}^{b=o} \Delta X$ and $Y = Y_o + \sum\limits_{\pm b\text{max}}^{b=o} \Delta Y$ Thus the curve starts at the zero or mid-position of the roller, and is generated by successive chords at angle $e$ following the contour of the roller rim as the roller tilts in either direction approaching the desired curve as a limit. This accomplishes the primary objective of aligning the contacting surfaces with elements of cones having a common apex point.

The X-Y coordinates of the curve may be computed with any desired precision by solving the above equations based on small increments of angle $b$.

Referring again to FIG. 1, shafts 6 and 16 are supported in bearings 11 and 13 which are mounted in a housing 66. Nut 10 adjusts discs 1 and 2 to a fixed and precise spacing. Bearing 11 is designed to keep the discs 1 and 2 in proper relation to the rollers 3 as thrust forces vary with the tilt position of the rollers. Pressure on the contact surfaces at 30 produces a thrust force along the axis of roller 3 which bearing 5 is designed to carry. Bearing 43 is designed to carry the forces tending to separate discs 1 and 2 in the direction of the drive shaft axis 6.

As previously noted, the tilt axis is displaced slightly as the rollers 3 are tilted if the instantaneous tilt center at point P does not coincide with the mechanical tilt axis 37. Means as shown in FIG. 9 must be provided in the mechanism for controlling and positioning the rollers 3 to permit this displacement and at the same time maintain adequate pressure in the direction of the roller axis to create the necessary traction. This pressure must be applied in the direction of the roller axis at an angle in order to equalize the contact pressures at points 30 on the roller. This cannot be accomplished by applying pressure in the direction of the drive shaft axis because of the difference in the contact angles on discs 1 and 2.

FIG. 1 shows a bearing for a roller 3 in which the inner race 48 may move in a direction normal to the roller axis in a plane radial to the main shaft axis 6. A pressure spool 8 has a tongue which projects into a groove in the inner race 48 permitting this movement. The pressure spool 8 is loaded by multiple diaphragm springs 49. Such springs can be designed to apply nearly uniform load within a range of movement which will accommodate the axial component of the displacement of the tilt center.

FIGS. 9 and 10 show a design in which the major part of the pressure on the rollers 3 is supplied by hydraulic pressure. The pressure spool 8 is replaced by a piston 50. A small initial load is applied by two diaphragm springs 52. These are sealed by a rubber seal 53 and held by a retaining ring 54. The spring also adds to the effective area of the piston. The piston is held in axial alignment by the closely fitted springs and by two guide pins 55 which also prevent rotation. The roller support extensions 35 are mounted in bearings consisting of balls 28 and outer races 29 pressed into support brackets 27. Coaxial with the roller support extension 35 and the outer races 29 are hydraulic cylinders 56 fitted with pistons 57 and 58 for moving the roller carriers in a plane normal to the main shaft axis so that the roller axis is offset by a controlled amount 67 from the main shaft axis, as shown in FIG. 10. The balls 28 permit the roller carrier to rotate and to shift axially in relation to the axis of the extensions 35.

In FIG. 10, if the disc 1 is considered to revolve in a clockwise direction and the roller carrier 4 is shifted to the left, the roller 3 in contact at point 30 will follow a spiral path, increasing the radial distance 68 from the center of disc 1. Conversely, the radial distance of the opposite contact of the roller on disc 2 will be decreased. This spiral is an involute with a base radius equal to the offset 67, so that the advance for one revolution is 2 pi times the offset. This changes the ratio so that the speed of the output shaft is increased. Obviously, this shifting may be quite rapid.

If the speed of revolution of disc 1 is substantially constant, as with a flywheel, and the output shaft is connected, for example, with the drive wheels of a vehicle, the driving force reacting on the roller 3 will increase, tending to move the roller carrier 4 to the right and reducing or stopping the tilting action. Hydraulic pressure on the piston 57 is balanced by the reactive force on the roller 3, thus providing a controllable means of increasing or decreasing the ratio. In the same manner, pressure on the opposite piston 58 may be used to balance the reactive force on the roller 3 to decelerate the vehicle or control it's speed on a down grade. FIG. 9 shows three rollers 3 and three pairs of cylinders. Ports 41 transmit pressure to the "driving" pistons and ports 42 to the "retarding" pistons, each set of ports being connected by a manifold to a suitable control means.

Pressure from a pair of control pistons 57 and 58 is transmitted through pushrods 59 and continuous passages to the roller pressure piston 50. A shuttle valve 60 admits pressure from the high pressure side but closes the opposite side by contact with the seat 61 on that side. This provides pressure on the roller piston proportional to the driving load. Each pushrod is sealed by a seat 62 in the piston and a seat 63 in the roller carrier. Each piston has a seal 64 contacting the cylinder bore and a spring 65 to provide pressure to seal the pushrods and seats at all times.

It is known that this kind of hydro-mechanical control is sometimes prone to "oscillate", which must be prevented. In such a case, well known hydraulic control systems can be used to avoid such oscillation.

Again in FIG. 1, seals 23 are installed in discs 1 and 2 contacting shaft 6, and seals 24 are provided on inner races 48 contacting rollers 3 to prevent lubricant from being deposited on the contact surfaces of races 31 and 32 and rollers 3.

Disc 2 has an extension 44 with spline teeth 45 as shown in FIGS. 1, 1A and 3. Slidably mounted on these spline teeth is a shifter collar 15 with engaging teeth 46. A set of planetary gears is shown in FIGs. 1, 1-A and 3. The planet pinions 17 are mounted on shafts 18 secured to a flange on shaft 16. The pinions 17 are held in place by retainers 12. Also on the flange of shaft 16 are teeth 33 which are engageable by the teeth of shifter collar 15 as shown in FIG. 1A. Rotatably mounted in the extension 44 of disc 2 is a sleeve 14 having a flange with teeth 34 engageable by teeth 46 of the shifter collar 15. On the inner surface of sleeve 14 are gear teeth engaging the teeth of planet pinions 17. On the inner end of sleeve 14 is an inwardly extending flange by which sleeve 14 is held in place by retainer 20 and lockring 21. On an extension of shaft 6 are gear teeth 47 engaging the planet pinions 17. A further extension of shaft 6 fits into a bearing 19 contained in shaft 16.

When the shifter collar 15 is in the position shown in FIG. 1, the sleeve 14 must rotate with disc 2, operating the planetary gears. This reduces the speed of shaft 16 in relation to disc 2 as driven by the rollers 3 and disc 1. When the ratio between disc 2 and disc 1 is reduced to the ratio of the planetary gears by tilting the rollers 3 toward the position shown in FIG. 2, the rotation of shaft 16 is stopped. This provides a neutral or stationary relation. If the rollers are tilted further to reduce the ratio between disc 2 and disc 1, the rotation of shaft 16 is reversed. If the rollers are tilted from the neutral position to increase the ratio between disc 2 and disc 1, a forward motion of shaft 16 is obtained. Thus a vehicle may be started, stopped or reversed smoothly under full control of the transmission and without the use of brakes for stopping or holding.

As the forward motion is increased, a speed is reached at which the shifter collar 15 may be shifted to the position shown in FIG. 1A, connecting disc 2 directly to shaft 16 by engaging teeth 33. When this shift is being made, it is necessary to tilt the rollers to obtain a suitable ratio between disc 2 and disc 1.

FIG. 8 shows a possible example. In the diagram the tilt of the rollers is shown on scale 22. A hypothetical scale in miles per hour is shown in 70. Curve 71 is the speed vs. tilt relation with the planetary gears operating. Curve 71A is the reverse portion. Curve 72 is the speed vs. tilt relation with shaft 16 connected directly with disc 2. 26 indicates the range of overlap in which a shift may be made without changing the speeds of the driving or driven devices.

A simple sliding collar type of shifter is shown for illustration. Synchronizing devices or friction clutches in highly developed form can also be used.

Figure 13:
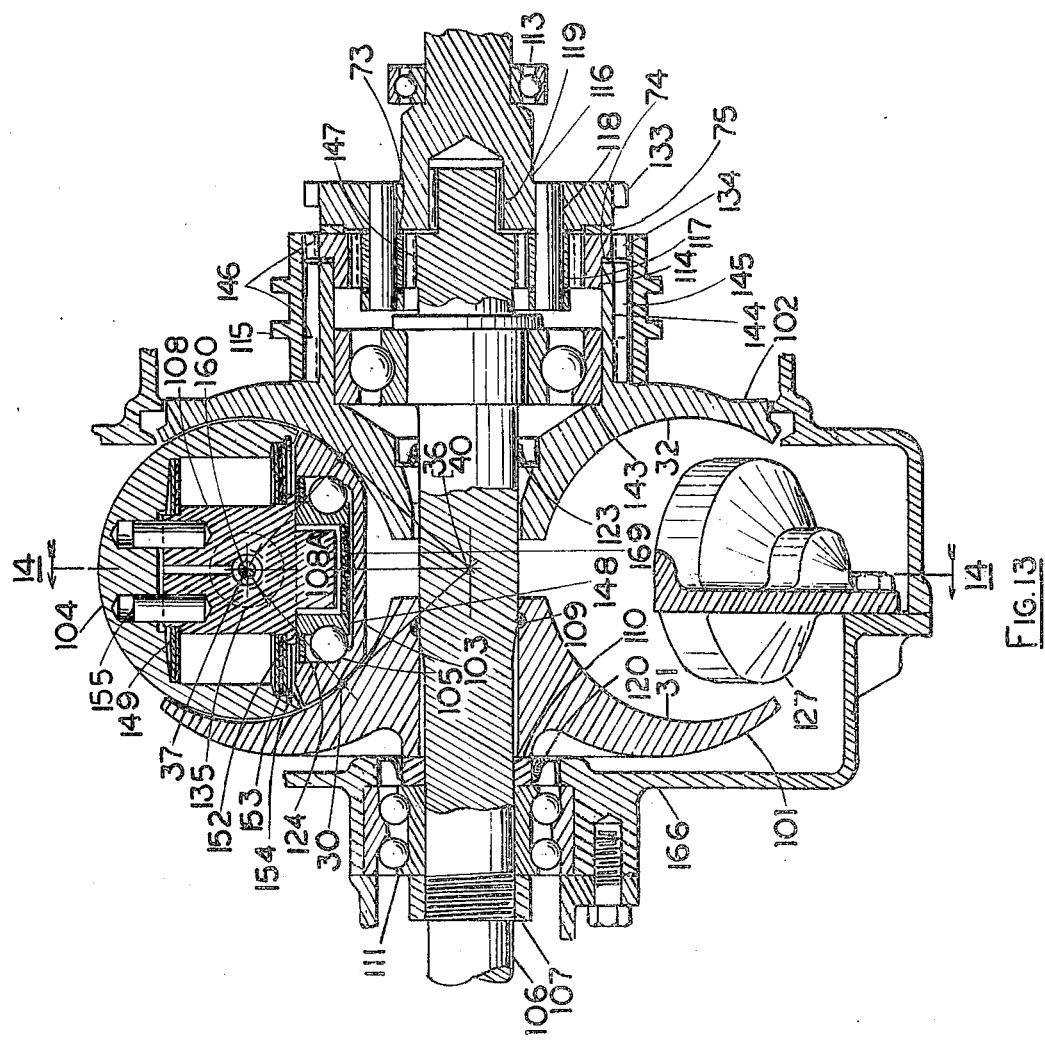
FIG. 13 is a longitudinal sectional view of a modified form of friction transmission.

FIG. 13 is a cross section of a modified form of the invention in a plane including the axes of the main driving shaft 106, a driven shaft 116 and a roller 103. A disc 101 (the driving member) is splined to shaft 106 and adjusted by nut 107. A disc 102 (the driven member) is mounted on shaft 106 by a thrust bearing 143. Disc 101 has a toric race 31 facing a race 32 of like form in disc 102. A set of rollers 103 contacts races 31 and 32 at contact points 30. Each roller is held in a roller carrier 104 and rotates on a bearing 105. As shown in FIGS. 13, 14, 15, 16 and 17, each roller carrier has trunions 135 which are supported as presently described with reference to FIGS. 14, 15 and 16, to permit the carrier with its roller to tilt as desired about an axis 37. This axis lies in a plane normal to the drive shaft axis 106 and is normal to the plane of the drawing in FIG. 13.

As the driving disc 101 rotates in one direction in contact with the rollers 103, the driven disc 102 rotates in the opposite direction at a speed depending on the tilt of the rollers 103. Means for controlling and changing the tilt are shown in FIGs. 14 and 15 and function in the manner of the previous form of the invention.

As shown in FIG. 14, a pump 171 supplies hydraulic fluid under pressure to a valve assembly 170 which controls the pressure delivered to a manifold 141A connected to the "drive" ports 141, and to a manifold 142A connected to the "retard" ports 142. The pump 171 draws fluid from a reservoir 174. Low pressure fluid from the valve 170 is returned to the reservoir through the tube 173.

In a vehicle propulsion system for example, the valve assembly 170 may receive and correlate a number of signals through a number of connections 175, such as vehicle driver control, engine speed, and engine torque as determined by reaction pressures from manifolds 141A and 142A in connection with the drive ratio as determined by the roller tilt position. This information may be organized according to a program which will control the speed and torque of the engine for maximum fuel economy. In other applications other data might be important for control.

Referring to FIG. 13, shafts 106 and 116 are supported in bearings 111 and 113 which are mounted in housing 166. Nut 107 adjusts discs 101 and 102 to a fixed and precise spacing. Bearing 111 is designed to keep the discs 101 and 102 in proper relation to the rollers 103 as thrust forces vary with the tilt of the rollers. Pressure on the contact surfaces 30 produces a thrust force along the axis of the roller which bearing 105 is designed to carry, along with the radial tractive forces. Bearing 143 is designed to carry the force tending to separate the discs 101 and 102 in the direction of the drive shaft axis 106.

As in the previous form of the invention, the tilt axis is displaced slightly as the rollers are tilted because the instantaneous tilt center does not usually coincide with the mechanical tilt axis 37. Means must be provided in the mechanism for controlling and positioning the rollers 103 to permit this displacement and at the same time maintain adequate pressure in the direction of the roller axis to create the necessary traction. This pressure must be applied in the direction of the roller axis in order to equalize the pressure at points 30. This cannot be done by applying pressure in the direction of the drive shaft axis 106 because of the difference in contact angles on discs 101 and 102. At extreme angles of tilt one contact angle, measured from the drive shaft axis 106 may be as low as 15° while the other is 55°. The contact pressure is inversely proportional to the sine of the angle, so that the pressure at the smaller angle might be three times as great as the other.

FIG. 13 shows a bearing for the roller 103 in which the inner race may move in a direction normal to the roller axis in a plane radial to the main shaft axis 106. The pressure spool 108 has a tongue 108A which projects into a groove in the inner race 148 permitting this movement. A plug 169 closes the end of this groove. The pressure spool 108 is aligned by multiple diaphragm springs 149 and 152. Such springs can be designed to apply nearly uniform load within a range which will accommodate the axial component of the displacement of the tilt center. In some applications where loading is fairly uniform the use of such springs alone may be satisfactory. However, for applications such as vehicle propulsion where there is extreme variation in loading it would be difficult to install enough springs in the space available without increasing the size and weight of the unit, and if the pressure were maintained at the maximum at all times the durability of bearings and other parts would be greatly reduced.

FIGS. 13-18 show designs in which the major part of the pressure on rollers 103 is supplied by hydraulic pressure in proportion to the applied driving load. The pressure spool is the core of a piston. A small initial load is applied by the diaphragm springs. In FIGS. 13 and 14 springs 152 are sealed by rubber seals 153 and held by a retaining ring 154. The springs add to the effective area of the piston. The piston is held in axial alignment by the closely fitted springs. Two guide pins 155 prevent rotation. The roller carrier trunnions 135 are mounted in bearings consisting of rollers 156 and pistons 128 and 129 which in turn are supported and centered radially by diaphragm springs 150. Balls 159 form thrust bearings. Springs 150 are held in bracket 127 by retaining ring 125 and sealed by rubber seal 151. An extension on each piston fits into a bore in bracket 127 to maintain axial alignment and to act as a dashpot. A small orifice 76 regulates the action of the dashpot. Seal 157 and spacer 158 confine the bearing rollers 156.

The pistons move the roller carrier in a plane normal to the main shaft axis 106 so that the roller axis is offset by a controlled amount 67 from the main shaft axis as shown in FIG. 10. The bearing rollers 156 permit the roller carrier to tilt and the diaphragm springs permit it to shift axially with a minimum of static friction. The resultant ratio changes have been explained previously with reference to FIG. 10.

FIGS. 15 and 16 show an optional construction in which roller carrier trunnion bearings 156 are supported in a piston supported by balls 80. These balls roll in an axial direction in grooves in the periphery of the piston 79 and in parallel grooves in a ring 82 installed in bracket 127. A flexible seal 81 confines the hydraulic fluid while the piston moves axially. A ring 84 confines the outer rim of the seal 81 and limits the travel of the balls 80. A ring 85 limits the travel of the balls in the other direction and contacts bearing seal 83. Lock ring 125 retains parts 81, 82, 84 and 85 in the bracket 127. This construction will provide a greater travel of the roller carrier 104 in an axial direction if this is desired to facilitate shifting.

Figure 17:
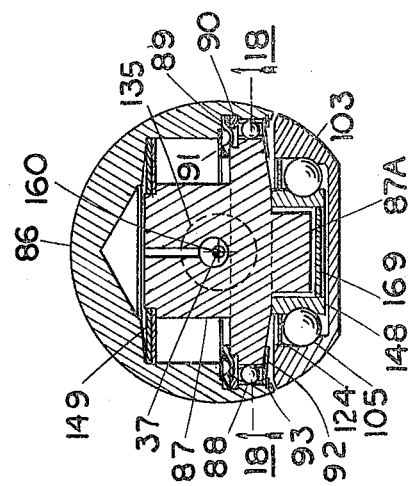
FIG. 17 is a sectional view of a further modified form of the structure shown in FIG. 13.
Figure 18:
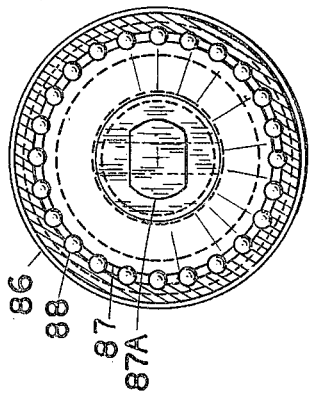
FIG. 18 is a sectional view taken along the line 18—18 in FIG. 17.

FIGS. 17 and 18 show a piston 87 supported by balls 88 in a roller carrier 86. Balls 88 roll in grooves in the periphery of the piston and in the cavity of the carrier 86 in a direction parallel to the axis of roller 103. A flexible seal 89 confines hydraulic fluid while the piston moves axially. A ring 90 confines the outer rim of the seal 89 and limits the travel of the balls 88. A diaphragm spring 91 presses the inner rim of the seal 89 against the piston 87. A shield 92 protects the balls 88 and limits their travel. A lockring 93 retains parts 90, 91 and 92. This construction may be preferred to that shown in FIGS. 13 and 14 in some uses. The primary radial load on the piston induced by the tractive force is carried by the balls 88. This load is considerably greater than the secondary load in the opposite direction carried by the diaphragm springs 149.

In the form shown in FIGS. 13-18 corresponding parts function in the same manner as the form shown in FIGS. 1-12. Roller 103 replaces roller 3, disc 101 replaces disc 1, disc 102 replaces disc 2, piston 128 (or 79) replaces piston 57, piston 129 replaces piston 58, ports 141 replaces ports 41 and ports 142 replace ports 42.

In FIG. 14, hydraulic pressure from a pair of control pistons 128 and 129 is transmitted through connector tubes 162 to the roller pressure piston 108. A shuttle valve 160 admits pressure from the high pressure side but closes the other side by contact with the seat 161 on that side. This provides pressure on the roller piston 108 proportional to the driving load. Each connector tube is sealed by ring seals 163 in the piston and in the roller carrier.

It is known that such hydro-mechanical systems are sometimes prone to oscillate, but well known means can be used to prevent this.

It is especially important to eliminate static friction in the axial shifting of the roller carriers in order to obtain smooth and accurate ratio control.

Again in FIG. 13 a static seal 109 contacts disc 101 and shaft 106, a running seal 123 is mounted in disc 102 to seal shaft 106, a seal 120 is mounted in housing 166 to seal bearing spacer 110 and a running seal 124 is mounted in roller 103 to seal the inner race 148. The rim of disc 102 is shaped to act as a baffle and slinger in conjunction with the shape of housing 166.

Disc 102 has an extension 144 with spline teeth 145. Slidably mounted on these splines is a shifter collar 115 with engaging teeth 146. In a set of planetary gears, pinions 117 are mounted on shafts 118 secured in a cage on output shaft 116. The pinions are held in place by thrust washers 73. Also on the flange of shaft 116 are teeth 133 which are engageable by teeth 146 of the shifter collar 115. Rotatably mounted in extension 144 of the disc 102 is a sleeve 114 having a flange with teeth 134 engagable by teeth 146 of the shifter collar 115. On the inner surface of sleeve 114 are gear teeth engaging the teeth of planet pinions 117. Sleeve 114 is held in place by thrust washers 74 and 75. On an extension of shaft 106 are gear teeth 147 engaging pinions 117.

The purpose and operation of the planetary gears will not be described, as the function of a similar set is fully set forth in the above described form of the invention.

It can thus be seen that the present invention provides true rolling action without lubrication of the traction surface which greatly reduces the required contact pressures and permits the use of conventional thrust bearings of reasonable size and also provides improved means of supporting and controlling each roller carrier to provide greater durability and permit shifting of the carrier along its axis with a minimum of static friction by means of:

(a) Radial support of the roller carrier in high capacity roller bearings.

(b) Transmitting thrust forces through ball bearings seated in deep grooves for higher capacity.

(c) Radial support of the roller carrier trunnion bearings by means of diaphragm (Belleville) springs which are radially rigid but axially flexible.

(d) Use of diaphragm springs as parts of hydraulic pistons which control the shifting of the roller carrier along its tilt axis.

(e) Optional use of rolling contact elements, such as balls, to support the roller piston and/or the roller carrier trunnion bearings.

(f) Improved means of sealing the fluid connection between the roller carrier control pistons and the roller pressure piston.

I claim:

1. In a friction transmission, the combination comprising a driving member, a driven member, means for mounting said members for rotation about a common axis, said members having oppositely facing annular arcuate surfaces, at least one roller contacting said surfaces, and means for supporting said roller with the axis thereof intersecting the common axis of said members, the periphery of said roller having a generally conical configuration, said annular surfaces of said members having a configuration such that lines tangent to the periphery of the roller and the races converge at the intersection of the axes of rotation of the roller and the common axis of the members at all positions of the roller, said means for supporting said roller permitting axial and lateral movement of said roller in a plane radial to the common axis of said members to conform to the noncircular contour of said annular surfaces, said means for supporting said roller including trunnion means for supporting said roller for rotation about an axis transverse to the axis of said roller and piston means associated with said trunnion means urging said trunnion means in the direction of said transverse axis, said means for supporting said roller comprising hydraulic means for applying a force proportional to the driving load on said piston means to urge said roller in the direction of the roller axis, and diaphragm means supporting said trunnion means for movement along said transverse axis only.

2. In a friction transmission, the combination comprising a driving member, a driven member, a common shaft, means of supporting said members for rotation about the axis of said common shaft, said members having oppositely facing annular arcuate surfaces, a thrust bearing on said common shaft, one of said members being mounted on said thrust bearing on said common shaft, means for fixing said members axially so that there is an exact spacing between said annular surfaces, at least one roller contacting said surfaces, means for supporting said roller with the axis thereof intersecting the common axis of said members, said means of supporting said roller having a tilt axis in a plane normal to the common axis of said members, the periphery of said roller having a generally convex conical configuration, said annular surfaces of said members having a configuration such that lines tangent to the periphery of the roller and the annular surfaces converge at the intersection of the axis of rotation of the roller and the common axis of the members at all positions of the roller, said means of supporting said roller permitting axial and lateral movement to conform to the non-circular contour of the annular surfaces, means of applying a force on said roller in the direction of the roller axis, and resilient means for maintaining said tilt axis in a fixed location with respect to the axial location of said members resulting in equal contact pressures of the roller on both members.

3. The combination set forth in claim 2 wherein said means for supporting said roller includes trunnion means for supporting said roller for rotation about an axis transverse to the axis of said roller and piston means associated with said trunnion means urging said trunnion means in the direction of said transverse axis.

* * * * *